Figure 1:
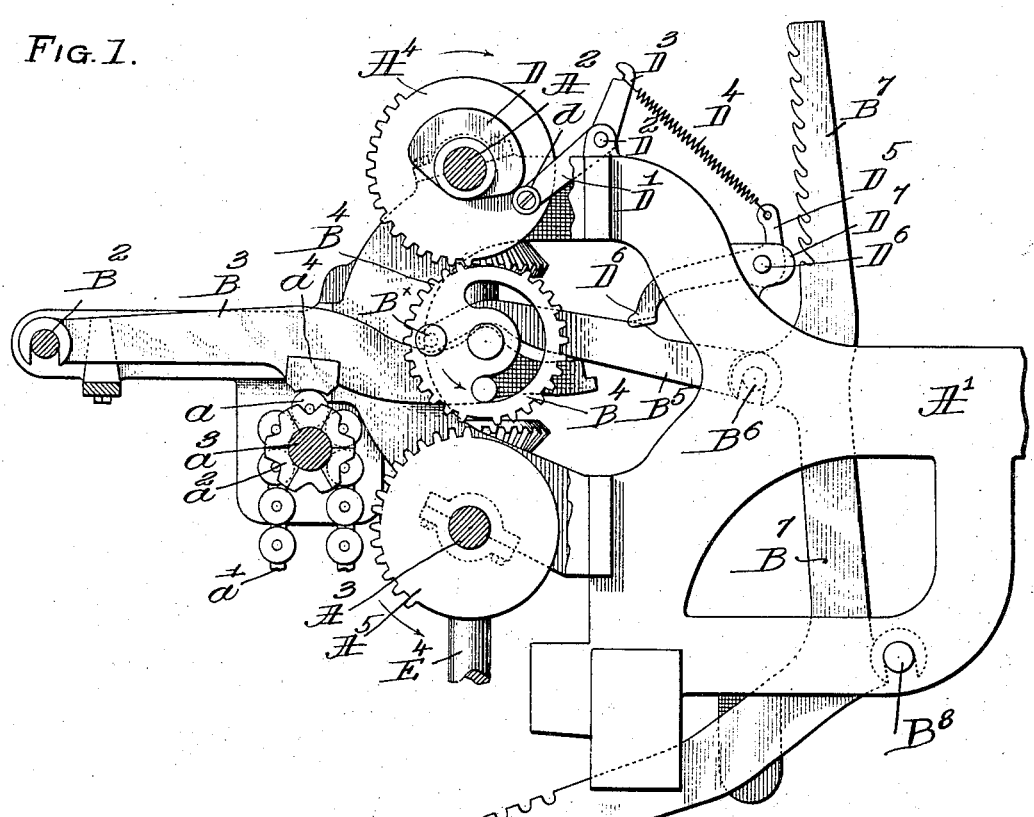

No. 767,218. PATENTED AUG. 9, 1904.
J. R. FITTON.
LOOM.
APPLICATION FILED FEB. 4, 1904.
NO MODEL.

WITNESSES:
Thomas J. Drummond
Fred S. Greenleaf

INVENTOR
JOHN R. FITTON
By Crosby Gregory
ATTORNEYS.

No. 767,218.

Patented August 9, 1904.

UNITED STATES PATENT OFFICE.

JOHN R. FITTON, OF WORCESTER, MASSACHUSETTS, ASSIGNOR TO CROMPTON-THAYER LOOM COMPANY, OF WORCESTER, MASSACHUSETTS.

LOOM.

SPECIFICATION forming part of Letters Patent No. 767,218, dated August 9, 1904.

Application filed February 4, 1904. Serial No. 191,917. (No model.)

*To all whom it may concern:*

Be it known that I, JOHN R. FITTON, a citizen of the United States, residing at Worcester, in the county of Worcester and State of Massachusetts, have invented an Improvement in Looms, of which the following description, in connection with the accompanying drawings, is a specification, like letters on the drawings representing like parts.

This invention has for its object to insure greater accuracy in the engagement of the vibrator-gears with the revolving partial cylinder-gears used to turn said vibrator-gears in one or the other direction to move the levers of shed-forming mechanism to change a shed or levers of a shuttle-box mechanism to change shuttle-boxes.

The mechanism herein shown by me, owing to its construction and operation and which I have applied to the usual parts of the class of loom with which I have chosen to illustrate my invention, reduces the wear on the connectors joining said vibrator-gears and the usual levers forming part of usual shed-forming mechanism and usual shuttle-box-changing mechanism.

In accordance with the invention to be herein described I have combined with each of the usual connectors a saddle that contacts with the upper edge thereof and means for acting intermittingly on said saddles to vary their pressure on the connectors.

In the form in which I have chosen herein to illustrate my invention each saddle has coacting with it a spring which is put under strain intermittingly during each rotation of one of the partial cylinder-gears, the excessive strain of each spring being exerted through the saddle onto a connector to insure the quick and accurate engagement of the vibrator-gear, with which it is connected with the lower partial cylinder-gear.

The particular means shown for increasing the effective tension or pressure of the springs on the saddles and causing the saddles to bear with the required force on the connectors comprises, as shown, a lever and a cam, the latter being represented as carried by the shaft of the upper partial cylinder-gear. This cam is so located with relation to the teeth of the partial cylinder-gear as to move the lever, stretch the spring, and cause the saddle to be forced against the connector with a force greater than that due substantially to gravity or to the weight of the saddle, as the vibrator-gear arrives substantially at the end of its outward stroke toward the fulcrum of the vibrator-lever, the extra pressure of the saddle being exerted at such time, so that in case an indicator carried by the usual pattern-chain is about to be moved from under a vibrator-lever, a change of shed or shuttle-box being about to be made, the connection will be moved quickly downwardly, so that the teeth of the vibrator-gear pivoted on said vibrator-lever will be engaged positively and come unerringly into engagement with the teeth of the vibrator-gear, thus obviating any chance of the teeth of the vibrator-gear not being correctly engaged with the teeth of the lower partial cylinder-gear. Any fault in accurate engagement of the vibrator-gear with the teeth of the partial cylinder-gear results in faults in the shed, and consequently in the weaving.

If the pressure of a saddle on a connector were always uniform and such pressure were sufficient to insure the quick and accurate engagement of the vibrator-gear with the under partial cylinder-gear, it will be understood that the friction of the saddle on the connector as the vibrator-gear is being turned from its inward position into its outward position, with the crank-pin thereon nearest the fulcrum of the vibrator-lever, would not only unnecessarily wear the upper sides of said connectors where the saddle comes in contact therewith, but more power would be required in moving the partial gears to turn the vibrator-gears, as the stress of the springs would have to be overcome, and when a number of such gears and springs are used side by side in a loom the extra power required would be very considerable.

In my invention the means for increasing pressure on the connector to insure its quick and accurate engagement with the teeth of the lower partial cylinder-gear is exerted as the engagement of the vibrator-gears with said lower partial cylinder-gear is to be effected, and, further, this pressure so exerted acts as soon as the teeth of a vibrator-gear retires from contact with either the upper or the lower partial gear and insures a complete semirotation of the vibrator-gear to place the same in one or the other of its two extreme positions with one or the other end of a slot in said gear in contact with a stop-pin carried by the vibrator-lever.

Figure 2:
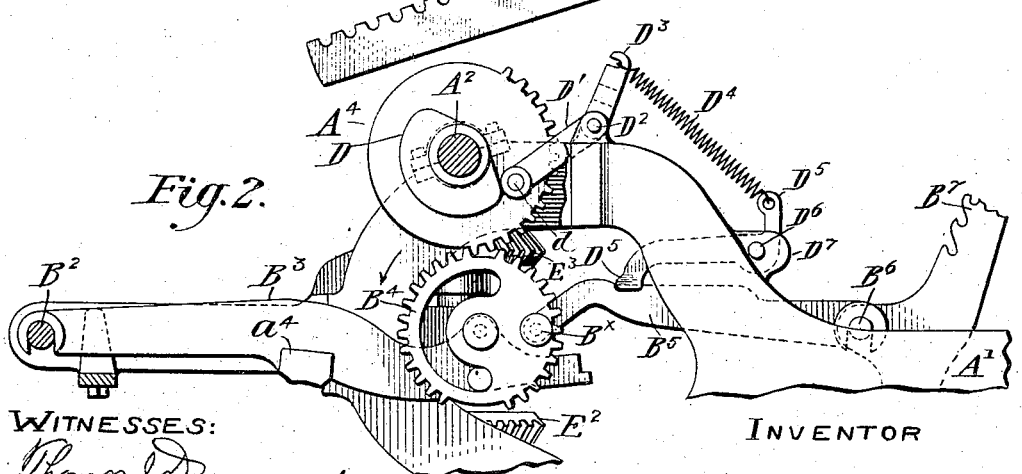

Figure 1 shows in section a sufficient portion of a loom of usual construction with my improvements added in one of the best forms now known to me to enable my invention to be fully comprehended, the parts being shown with the vibrator-crank in its position nearest the fulcrum of the vibrator-lever or in its outward position; and Fig. 2 is a detail showing the cylinder-gear and the cam in its inoperative position.

Referring to the drawings, A' represents part of the usual head-motion frame. This head-motion frame has bearings to sustain the shafts $A^2$ $A^3$, that carry, respectively, the upper and lower partial gears $A^4$ and $A^5$, the upper gear constituting an elevator and the lower gear a depressor. Each of these shafts has connected with it the shorter box-motion partial cylinder-gears B B'. The head also sustains a rod $B^2$, that constitutes the fulcrum for a series of vibrator-levers $B^3$, on which are pivoted the vibrator-gears $B^4$, having crank-pins $B^x$, with which are joined connectors $B^5$, engaging studs $B^6$ of harness-levers $B^7$, mounted upon a sustaining-rod $B^8$, supported in the head-frame.

The vibrator-levers are raised by indicators (represented as rolls) $a$ on a pattern-chain $a'$, that derives its movement from a pattern-chain carrier $a^2$, mounted on a shaft $a^3$, rotated in usual manner, so as to bring one indicator after another in contact with plates $a^4$ of the vibrator-levers, said indicators when contacting with a plate instantly raising the lever and its attached vibrator-gear, putting the teeth of said gear into engagement with the teeth of the constantly-moving partial gear $A^4$.

The parts so far described are common to so-called "open-shed" fancy looms, and the shafts $A^2 A^3$ and pattern-cylinder will be moved as commonly done in that class of loom, and no claim is herein made for any of said parts separately.

In accordance with my invention I have provided the shaft $A^2$ with a cam D, that in its rotation acts upon a roller or other stud $d$ of an arm D' of a rock-shaft $D^2$, said rock-shaft having extended from it a series of fingers $D^3$, each having, as shown, a suitable hook, with which is engaged a draw-spring $D^4$. The opposite end of each draw-spring is connected with a saddle $D^5$, (shown as an elbow-lever,) pivoted at $D^6$ on an ear $D^7$, extended from the head-motion frame and resting on the upper edge of a connector $B^5$.

The drawings show an indicator A as having lifted one of the vibrator-levers and as having engaged the vibrator-gear with the upper cylinder-gear $A^4$, the latter having acted to turn the vibrator-gear into position to carry its crank-pin $B^x$ substantially to the end of its stroke, so that as long as said vibrator-lever is held up by the indicator the upper cylinder-gear may rotate without engaging the vibrator-gear.

The vibrator-gear when moved from the position shown in the drawings will be turned in a direction opposite the arrow thereon, and its teeth will engage the lower cylinder.

The drawings show the cam D as acting upon the roller-stud of arm D' and as having strained the spring $D^4$, the latter exerting pressure upon the saddle $D^5$, (represented as pivoted at $D^6$,) so that the free end of said saddle exerts a strong downward pressure on the upper side of the connection $B^5$. It will be understood, of course, that there is a finger $D^3$ and a spring and a saddle for each connector. The pattern-surface is moved for a redistribution of a shed when the parts are in the position shown in the drawings, and immediately that the indicator $a$ passes from under the plate $a^4$ the saddle acting through the strained spring pushes on the connector and depresses the vibrator-gear, so that its teeth come into engagement with the teeth of the lower cylinder-gear at just exactly the proper point and without any liability of meshing wrongly. The vibrator-lever was raised by an indicator to put the vibrator-gear in engagement with the upper partial cylinder-gear $A^4$ while the cam D was out of contact with the roller-stud $d$, as represented in the detail, Fig. 2, and at such time the springs $D^4$ were not strained and the saddles rested on the connectors only by a force due to their gravity. As soon, however, as the cam D strikes the stud $d$ the springs $D^4$ are strained, and thereafter in the further rotation of the cylinder-gear the springs are held strained, so that the saddles become effective in controlling the connectors and the vibrator-gears to insure accuracy of engagement of the vibrator-gears with the cylinder-gear $a^3$ when the pattern-indicators indicate demand. The spring acts instantly whenever an indicator passes from under the vibrator-lever. In this way it will be understood that the cam D, through the arm, rock-shaft, and fingers, causes the springs to exert intermitting downward pressure upon the connectors during only a portion of the time of each semirotation of the cylinder-gears and the vibrator-gears instead of exerting a downward spring-pressure, as heretofore, throughout the entire rotation of the cylinder-gear and vibrator-gear.

By relieving the pressure of the springs on the saddles bearing on the connectors throughout most of the time of a semirotation of the vibrator-gears much power is saved in rotating the partial cylinder-gears and also the wear of the connectors by reason of the strong pressure of the saddles thereon as the connectors are moved through the vibrator-gears is done away with.

In practice the notched ends of the vibrator-levers will have coacting with them lever-locking means common to the Knowles patent.

Referring to Fig. 2, the vibrator-gear is supposed to have just been lifted so that its teeth may be engaged with the teeth of the cylinder-gear, and as the cylinder-gear rotates the vibrator-gear from the position Fig. 2 into the position Fig. 1 the pressure of the springs $D^4$ is relaxed.

Having described my invention, what I claim as new, and desire to secure by Letters Patent, is—

1. In a loom having partial cylinder-gears, vibrator-levers, vibrator-gears, and connectors, means acting intermittingly during each rotation of said partial cylinder-gears to press downwardly on said connectors and hold the vibrator-gears steadily preparatory to effecting the engagement of a vibrator-gear with one of said partial cylinder-gears.

2. In a loom having partial cylinder-gears, vibrator-levers, vibrator-gears, and connectors, means acting intermittingly during each rotation of said partial cylinder-gears to press said connectors downwardly and with them the vibrator-gears preparatory to effecting the engagement of a vibrator-gear with said lower partial cylinder-gear.

3. In a loom, partial cylinder-gears, means to rotate the same, vibrator-levers, vibrator-gears, and a pattern-surface for controlling the position of said vibrator-levers, combined with a cam, a series of saddles, a series of springs, and means actuated by said cam to cause said springs to exert greater pressure on said connectors during a part of each rotation of said cylinder-gears than during the remaining portion of each rotation of said gears.

In testimony whereof I have signed my name to this specification in the presence of two subscribing witnesses.

JOHN R. FITTON.

Witnesses:
   Alexander H. Bullock,
   Alcide O. Mondor.